US008611908B2

(12) United States Patent
Usuda et al.

(10) Patent No.: US 8,611,908 B2
(45) Date of Patent: Dec. 17, 2013

(54) MOBILE COMMUNICATION METHOD, BASE STATION AND WIRELESS LINE CONTROL STATION

(75) Inventors: Masafumi Usuda, Tokyo (JP); Anil Umesh, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1050 days.

(21) Appl. No.: 11/662,998

(22) PCT Filed: Sep. 16, 2005

(86) PCT No.: PCT/JP2005/017190
§ 371 (c)(1), (2), (4) Date: Jul. 5, 2007

(87) PCT Pub. No.: WO2006/030914
PCT Pub. Date: Mar. 23, 2006

(65) Prior Publication Data
US 2007/0293257 A1 Dec. 20, 2007

(30) Foreign Application Priority Data
Sep. 17, 2004 (JP) ................ P2004-272414

(51) Int. Cl.
*H04W 72/00* (2009.01)
(52) U.S. Cl.
USPC ............... 455/450; 455/509; 370/230
(58) Field of Classification Search
USPC ............ 455/452.2, 450, 451, 452.1, 464; 370/229, 317, 320, 333, 335, 332, 341, 370/437
See application file for complete search history.

(56) References Cited

U.S. PATENT DOCUMENTS 5,886,988 A 3/1999 Yun et al.
6,842,618 B2 * 1/2005 Zhang ................ 455/452.1
(Continued)

FOREIGN PATENT DOCUMENTS

EP 1 437 912 A1 7/2004
JP 2002-217956 8/2002
(Continued)

OTHER PUBLICATIONS

Panasonic; "Target RoT control methods for HSUPA (Update of R1-040780)"; 3GPP TSG RAN1 #38; Prague, Czech Republic Aug. 16-20, 2004, (4 pages).

(Continued)

*Primary Examiner* — San Htun
*Assistant Examiner* — Magdi Elhag
(74) *Attorney, Agent, or Firm* — Marvin A. Motsenbocker; Mots Law, PLLC (57) ABSTRACT

It is an object of the present invention, in a mobile communication system using the Enhanced Uplink, to maximize a capacity of a radio resource for use in a circuit switching channel, and to provide a data communication as a best effort service using an available radio resource. The present invention includes, in the mobile communication system, a step of measuring an enhanced noise rise within a predetermined frequency bandwidth, a step of measuring a total interference noise rise within the predetermined frequency bandwidth, and a step of determining whether or not to set a new channel within the predetermined frequency bandwidth based on the enhanced noise rise and the total interference noise rise in response to a setup request for the new channel from a mobile station UE.

2 Claims, 9 Drawing Sheets

(56) References Cited

U.S. PATENT DOCUMENTS

| | | | |
|---|---|---|---|
| 7,013,143 B2* | 3/2006 | Love et al. | 455/450 |
| 7,324,821 B2* | 1/2008 | Kwak et al. | 455/453 |
| 7,343,176 B2* | 3/2008 | Ahn et al. | 455/560 |
| 8,175,039 B2* | 5/2012 | Heo et al. | 370/329 |
| 2005/0025100 A1 | 2/2005 | Lee et al. | |
| 2005/0083943 A1* | 4/2005 | Lee et al. | 370/395.4 |
| 2005/0157687 A1* | 7/2005 | Heo et al. | 370/335 |
| 2005/0207359 A1* | 9/2005 | Hwang et al. | 370/278 |
| 2005/0249148 A1* | 11/2005 | Nakamata et al. | 370/328 |
| 2005/0250512 A1* | 11/2005 | Zhang et al. | 455/453 |

FOREIGN PATENT DOCUMENTS

| | | |
|---|---|---|
| JP | 2002-217956 A | 8/2002 |
| JP | 2004-248300 A | 9/2004 |
| KR | 2004-0074015 | 8/2004 |
| WO | WO 02/093777 A2 | 11/2002 |
| WO | 02100053 A1 | 12/2002 |
| WO | 02101956 A1 | 12/2002 |
| WO | 2004057774 A2 | 7/2004 |

OTHER PUBLICATIONS

Holma H et al., "WCDMA for UMTS" WCDMA for UMTS: Radio Access for Third Generation Mobilecommunications, XX, XX, Jan. 1, 2000, pp. 214-217, XP002253937.

Office action issued on Oct. 19, 2011 in the counterpart European patent application.

* cited by examiner

MOBILE COMMUNICATION METHOD, BASE STATION AND WIRELESS LINE CONTROL STATION

TECHNICAL FIELD

The present invention relates to a mobile communication method, a base station, and a radio network controller, which improve communication performance (communication capacity, communication quality, and the like) of a mobile communication system. Especially, the present invention is a technology that is adaptable to the "W-CDMA" system and the "CDMA2000" system, which are the third-generation mobile communication systems.

BACKGROUND ART

In a conventional mobile communication system, in an uplink communication n from a mobile station UE to a base station Node-B, a radio network controller RNC determines a transmission rate of a dedicated channel in consideration of a radio resource of the base station Node-B, an interference amount in such an uplink communication, transmission power of the mobile station UE, transmission processing performance of the mobile station UE, a transmission rate required by an upper-level application, and the like. Then, the radio network controller RNC notifies the determined transmission rate of the dedicated channel individually to the mobile station UE and the base station Node-B by a message of the Layer 3 (Radio Resource Control Layer).

Here, the radio network controller RNC is an apparatus that is located at an upper level of the base station Node-B, and controls the base station Node-B and the mobile station UE.

In general, in the data communication, it is more frequent that traffic occurs in a bursting manner than in a voice communication and a TV telephone communication, and it is primarily desirable to change a transmission rate of a channel for use in the data communication at a high speed.

Figure 1:
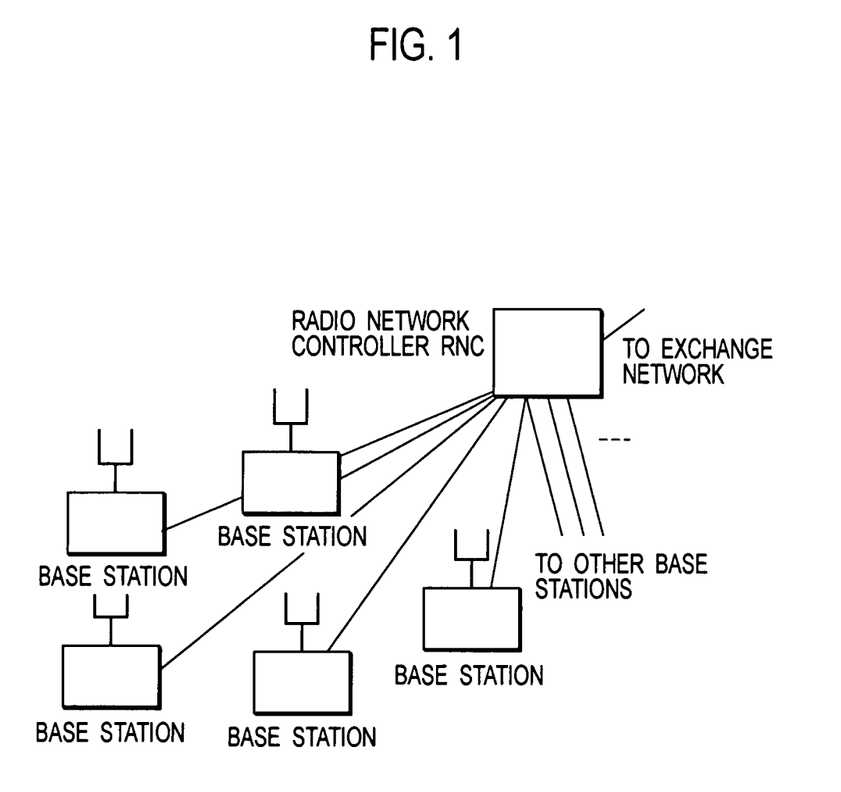
FIG. 1 is an entire configuration view of a mobile communication system according to a conventional technology.

However, as shown in FIG. 1, the radio network controller RNC usually controls many base stations Node-B in a centralizing manner, and accordingly, in the conventional mobile communication system, there has been a problem that it is difficult to perform such a high-speed (for example, at approximately 1 to 100 ms) change control for the transmission rate because of the reasons such as a processing load and a processing delay.

Moreover, in the conventional mobile communication system, even if the high-speed change control for the transmission rate of the channel can be performed, there has been a problem that implementation cost of the apparatus and operation cost thereof are increased to a large extent.

Therefore, in the conventional mobile communication system, it is usual to perform the change control for the transmission rate of the channel in several hundred-millisecond to several-second orders.

Hence, in the conventional mobile communication system, in the case of performing a bursting data transmission as shown in FIG. 2(a), the data is transmitted as shown in FIG. 2(b) while permitting a low speed, a high delay, and low transfer efficiency, or the data is transmitted as shown in FIG. 2(c) while ensuring a radio resource for a high-speed communication and permitting waste of a radio bandwidth resource and a hardware resource in the base station during an open time.

Figure 2:
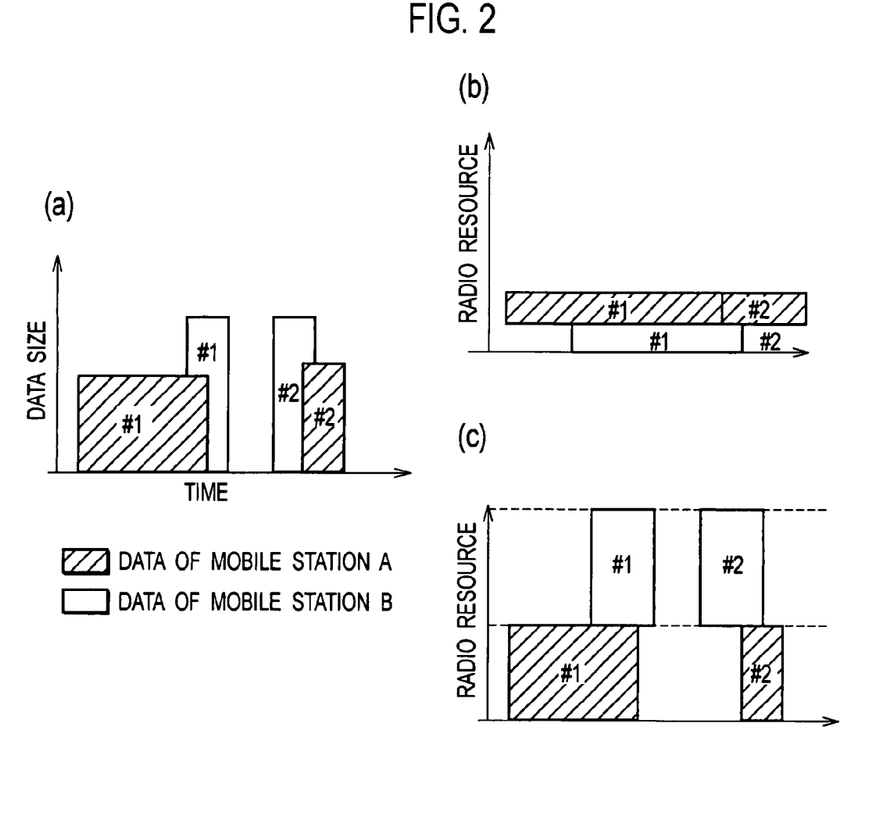
FIGS. 2(a) to 2(c) are views showing states of assigning radio resources to mobile stations in the mobile communication system according to the conventional technology.

Note that, in FIG. 2, both of the above-described radio bandwidth resource and hardware resource apply to a radio resource of an axis of ordinates.

In this connection, in the "3GPP" and the "3GPP2" which are the international standardization organizations of the third-generation mobile communication system, there has been studied a high-speed radio resource control method in the layer 1 and the MAC sub layer (layer 2) between the base station and the mobile station for the purpose of effectively utilizing the radio resource. Hereinafter, such a study and a function thus studied will be generically referred to as "Enhanced Uplink".

In the Enhanced Uplink, the base station Node-B controls the transmission rate of the channel for use in the uplink communication in lower-level layers (layer 1 and layer 2), thus making it possible to increase a throughput of a cell.

Figure 3:
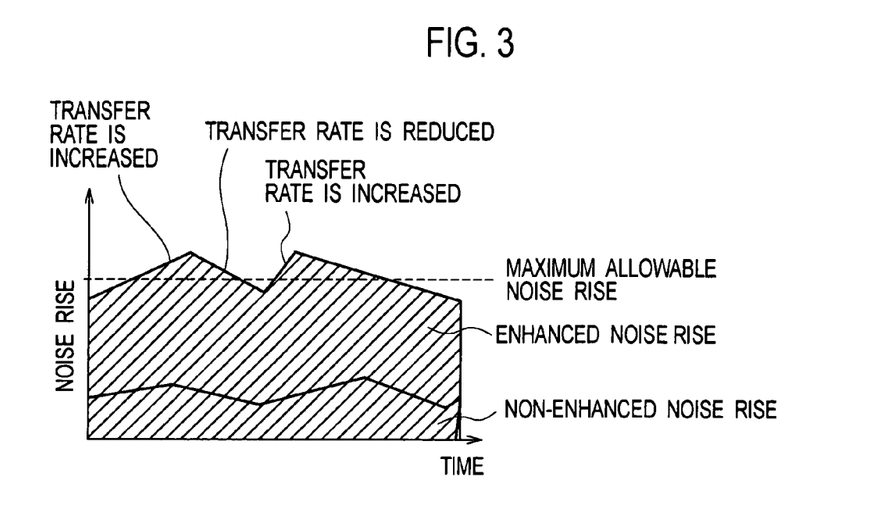
FIG. 3 is a view showing a state of controlling a transmission rate of an uplink channel in the mobile communication system according to the conventional technology.

Specifically, as shown in FIG. 3, the base station Node-B is configured to measure a noise rise of the channel for use in the uplink communication, and to sequentially control the transmission rate of the channel so that the noise rise of the channel can converge to a level approximate to a maximum allowable noise rise.

Here, the noise rise is a ratio (received signal level from a noise floor) of interference power in a predetermined channel within a predetermined frequency and noise power (thermal noise power and noise power from the outside of the mobile communication system) within the predetermined frequency.

Note that, in this specification, a channel to which the Enhanced Uplink is applied will be referred to as an "enhanced channel" (for example, a dedicated channel to which the Enhanced Uplink is applied will be referred to as an "enhanced dedicated channel"), and a channel to which the Enhanced Uplink is not applied will be referred to as a "non-enhanced channel").

Moreover, the enhanced channel is usable while being present mixedly with a conventional channel such as a circuit switching channel, a dedicated physical control channel (DPCCH), and an uplink control channel for controlling a downlink network.

In the uplink communication in the conventional mobile communication system (especially, a mobile communication system that adopts the CDMA system), call acceptance control processing is performed by using the noise rise in addition to a hardware resource of the base station Node-B.

Meanwhile, in a downlink communication in the conventional mobile communication system, the call acceptance control processing is performed by using total transmission power of the base station Node-B in addition to the hardware resource of the base station Node-B.

Specifically, in the uplink communication in the conventional mobile communication system, when the hardware resource of the base station Node-B is sufficiently present in comparison with a capacity of a radio bandwidth resource, the call acceptance control processing is performed by the noise rise (specifically, it is determined whether or not a new channel is to be set).

(Non-Patent Document 1) "W-CDMA Mobile Communication System" published by Keiji Tachikawa, Jon Wiley & Sons However, in the conventional mobile communication system, the transmission rate of the channel for use in the uplink communication is controlled so as to always increase the noise rise to the maximum allowable noise rise when the Enhanced Uplink is applied. Accordingly, there has been a problem that highly accurate call acceptance control processing becomes difficult.

Moreover, there has been a problem that, though the enhanced channel is a channel for use in a best effort data communication, and in usual, priority thereof is lower than that of a circuit switching communication of voices, real-time moving pictures, and the like, there can occur a state where the noise rise is occupied by the enhanced channel, resulting in that a circuit switching call cannot be accepted (specifically, the circuit switching channel cannot be set).

DISCLOSURE OF THE INVENTION

In this connection, the present invention has been made in consideration for the above-described points, and it is an object of the present invention to provide, in the mobile communication system using the Enhanced Uplink, a mobile communication method, a base station, and a radio network controller, which maximize the capacity of the radio resource for use in the circuit switching channel (circuit switching call), and provide the data communication as a best effort service using an available radio resource.

A first aspect of the present invention is summarized as a mobile communication method for using an enhanced dedicated channel, in which a transmission rate is controlled in a layer 1 and a layer 2, for an uplink communication from a mobile station to a base station, the method including the steps of: measuring an enhanced noise rise which is a ratio of interference power in the enhanced dedicated channel within a predetermined frequency bandwidth and noise power within the predetermined frequency bandwidth; measuring a total interference noise rise which is a ratio of interference power in entire channels for use in the uplink communication within the predetermined frequency bandwidth and the noise power within the predetermined frequency bandwidth; and determining whether or not to set a new channel within the predetermined frequency bandwidth, based on the enhanced noise rise and the total interference noise rise, in response to a setup request for the new channel from the mobile station.

In the first aspect of the present invention, when a value obtained by subtracting the enhanced noise rise from the total interference noise rise within the predetermined frequency bandwidth falls down below a predetermined threshold value, it can be determined that the new channel is to be set within the predetermined frequency bandwidth.

In the first aspect of the present invention, a value that varies depending on a type of the new channel can be used as the predetermined threshold value.

A second aspect of the present invention is summarized as a mobile communication method using an enhanced dedicated channel, in which a transmission rate is controlled in a layer 1 and a layer 2, for an uplink communication from a mobile station to a base station, the method including the steps of: measuring a non-enhanced noise rise which is a ratio of interference power in a non-enhanced channel which is a channel other than the enhanced dedicated channel within a predetermined frequency bandwidth and noise power within the predetermined frequency bandwidth; measuring a total interference noise rise which is a ratio of interference power in entire channels for use in the uplink communication within the predetermined frequency bandwidth and the noise power within the predetermined frequency bandwidth; and determining whether or not to set a new channel within the predetermined frequency bandwidth, based on the non-enhanced noise rise and the total interference noise rise, in response to a setup request for the new channel from the mobile station.

In the second aspect of the present invention, when a value obtained by subtracting the non-enhanced noise rise from the total interference noise rise within the predetermined frequency bandwidth exceeds a predetermined threshold value, it can be determined that the new channel is to be set within the predetermined frequency bandwidth.

A third aspect of the present invention is summarized as a base station in a mobile communication system using an enhanced dedicated channel, in which a transmission rate is controlled in a layer 1 and a layer 2, for an uplink communication from a mobile station to a base station, including: an enhanced noise rise measurement section configured to measure an enhanced noise rise which is a ratio of interference power in the enhanced dedicated channel within a predetermined frequency bandwidth and noise power within the predetermined frequency bandwidth; and a total interference noise rise measurement section configured to measure a total interference noise rise which is a ratio of interference power in entire channels for use in the uplink communication within the predetermined frequency bandwidth and the noise power within the predetermined frequency bandwidth.

In the third aspect of the present invention, the base station can further include: a notification section configured to notify the enhanced noise rise and the total interference noise rise to a radio network controller for each frequency bandwidth.

A fourth aspect of the present invention is summarized as a base station in a mobile communication system using an enhanced dedicated channel, in which a transmission rate is controlled in a layer 1 and a layer 2, for an uplink communication from a mobile station to a base station, including: a non-enhanced noise rise measurement section configured to measure a non-enhanced noise rise which is a ratio of interference power in a non-enhanced channel which is a channel other than the enhanced dedicated channel within a predetermined frequency bandwidth and noise power within the predetermined frequency bandwidth; and a total noise rise measurement section configured to measure a total interference noise rise which is a ratio of interference power in entire channels for use in an uplink communication within the predetermined frequency bandwidth and the noise power within the predetermined frequency bandwidth.

In the fourth aspect of the present invention, the base station can further include: a notification section configured to notify the non-enhanced noise rise and the total interference noise rise to a radio network controller for each frequency bandwidth.

A fifth aspect of the present invention is summarized as a radio network controller in a mobile communication system using an enhanced dedicated channel, in which a transmission rate is controlled in a layer 1 and a layer 2, for an uplink communication from a mobile station to a base station, including: an enhanced noise rise reception section configured to receive, from the base station, an enhanced noise rise which is a ratio of interference power in the enhanced dedicated channel within a predetermined frequency bandwidth and noise power within the predetermined frequency bandwidth; a total interference noise rise reception section configured to receive, from the base station, a total interference noise rise which is a ratio of interference power in entire channels for use in the uplink communication within the predetermined frequency bandwidth and the noise power within the predetermined frequency bandwidth; and a determination section configured to determine whether or not to set a new channel within the predetermined frequency bandwidth, based on the enhanced noise rise and the total interference noise rise, in response to a setup request for the new channel from the mobile station.

In the fifth aspect of the present invention, the determination section can be configured to determine that the new channel is to be set within the predetermined frequency bandwidth, when a value obtained by subtracting the enhanced noise rise from the total interference noise rise within the predetermined frequency bandwidth falls down below a predetermined threshold value.

In the fifth aspect of the present invention, a value that varies depending on a type of the new channel can be used as the predetermined threshold value.

A sixth aspect of the present invention is summarized as a radio network controller in a mobile communication system using an enhanced dedicated channel, in which a transmission rate is controlled in a layer 1 and a layer 2, for an uplink communication from a mobile station to a base station, including: an enhanced noise rise reception section configured to receive, from the base station, a non-enhanced noise rise which is a ratio of interference power in a non-enhanced channel which is a channel other than the enhanced dedicated channel within a predetermined frequency bandwidth and noise power within the predetermined frequency bandwidth; a total interference noise rise reception section configured to receive, from the base station, a total interference noise rise which is a ratio of interference power in entire channels for use in the uplink communication within the predetermined frequency bandwidth and the noise power within the predetermined frequency bandwidth; and a determination section configured to determine whether or not to set a new channel within the predetermined frequency bandwidth, based on the non-enhanced noise rise and the total interference noise rise, in response to a setup request for the new channel from the mobile station.

In the sixth aspect of the present invention, the determination section can be configured to determine that the new channel is to be set within the predetermined frequency bandwidth, when a value obtained by subtracting the non-enhanced noise rise from the total interference noise rise within the predetermined frequency bandwidth exceeds a predetermined threshold value.

BEST MODE FOR CARRYING OUT THE INVENTION

Figure 4:
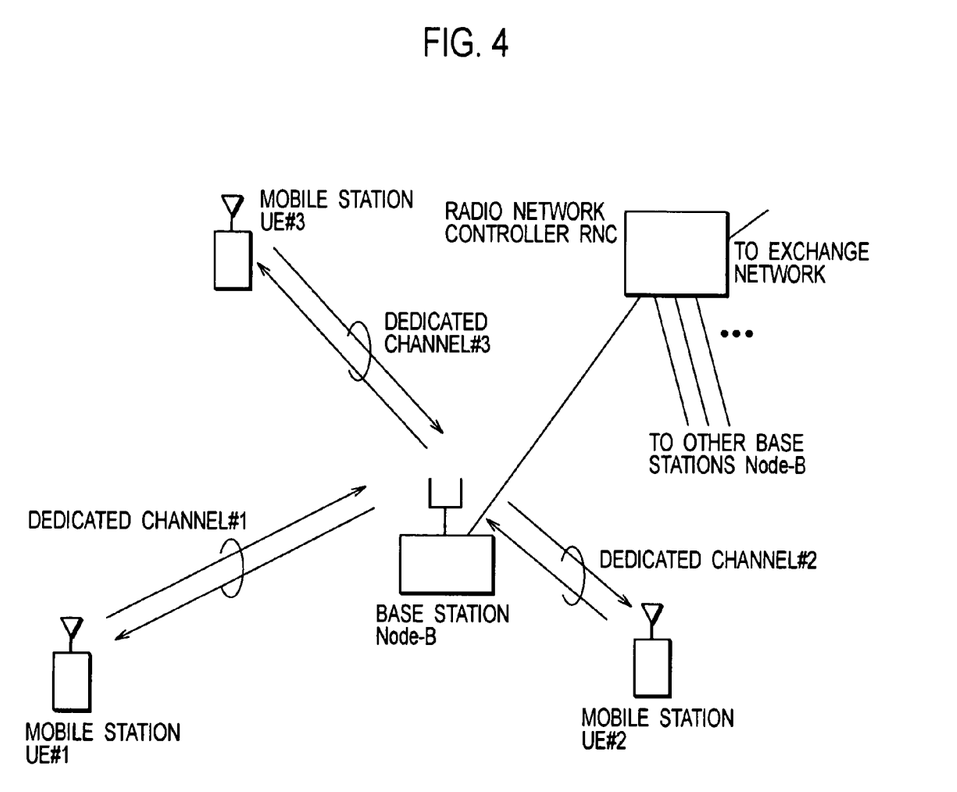
FIG. 4 is an entire configuration view of a mobile communication system according to a first embodiment of the present invention.

Configuration of Mobile Communication System According to First Embodiment of the Present Invention An example of an entire configuration of a mobile communication system according to a first embodiment of the present invention is shown in FIG. 4. As shown in FIG. 4, the mobile communication system according to this embodiment includes an exchange network, a radio network controller RNC, a base station Node-B, and mobile stations UE #1 to #3. Note that the individual mobile stations UE #1 to #3 transmit and receive data, by using dedicated channels #1 to #3, respectively.

Figure 5:
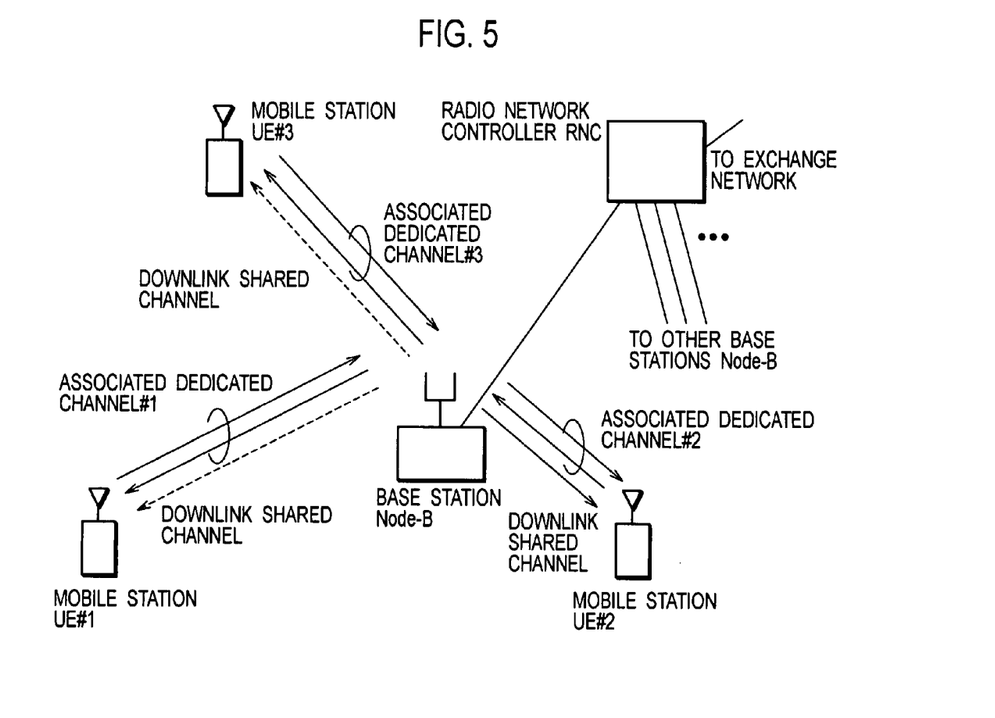
FIG. 5 is an entire configuration view of the mobile communication system according to the first embodiment of the present invention.

Here, as shown in FIG. 5, the case is also considered, where high-speed downlink shared channels (HS-DSCHs in 3GPP) are used in the mobile communication system according to this embodiment. In such a case, downlink data is transmitted mainly by using the downlink shared channels.

Moreover, associated dedicated channels are bi-directional channels assigned dedicatedly to the respective mobile stations UE that make communications by using the downlink shared channels. In the uplink associated dedicated channels, pilot symbols, transmission power control commands for the downlink associated dedicated channels, downlink quality information for use in scheduling and adaptive modulation and coding of the downlink shared channels, and the like are transferred as well as user data. Furthermore, in the downlink associated dedicated channels, transmission power control commands for the uplink associated dedicated channels, and the like are transferred. In FIG. 5, it is defined that the channels are not assigned to the downlink shared channels shown by dotted lines at this point of time.

Figure 6:
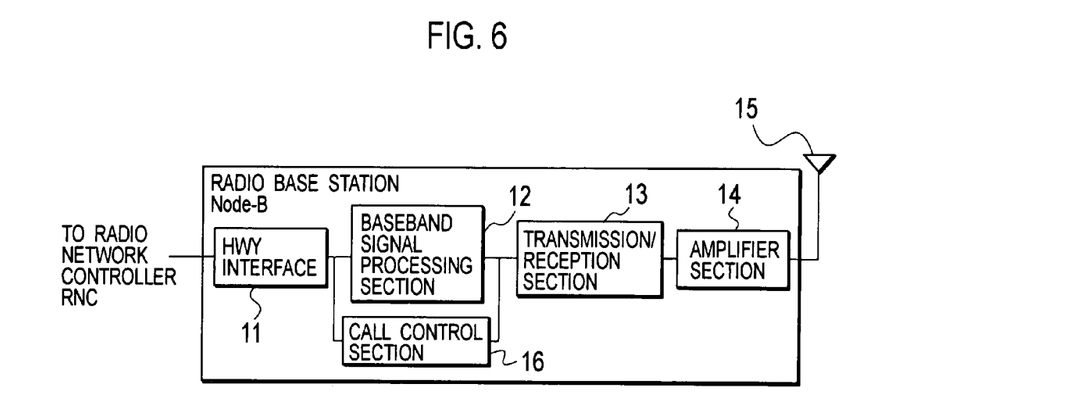
FIG. 6 is a functional block diagram of a base station according to the first embodiment of the present invention.

FIG. 6 is a view showing an example of a schematic configuration of the base station Node-B of the mobile communication system according to this embodiment.

As shown in FIG. 6, the base station Node-B includes an HWY interface 11, a baseband signal processing section 12, a transmission/reception section 13, an amplifier section 14, a transmission/reception antenna 15, and a call control section 16.

The HWY interface 11 is configured to input, to the baseband signal processing section 12, downlink data transmitted from the radio network controller RNC located at an upper level of the base station Node-B.

Moreover, the HWY interface 11 is configured to transfer, to the radio network controller RNC, uplink data for which predetermined processing in the baseband signal processing section 12 has been performed.

The baseband signal processing section 12 is configured to perform the layer 1 processing such as channel coding processing and spreading processing for the received downlink data, and then to transfer the downlink data to the transmission/reception section 13.

Moreover, the baseband signal processing section 12 is configured to perform the layer 1 processing such as despreading processing, RAKE synthesis processing, and error correction decoding processing for the received uplink data, and then to transfer the uplink data to the HWY interface 11.

Figure 7:
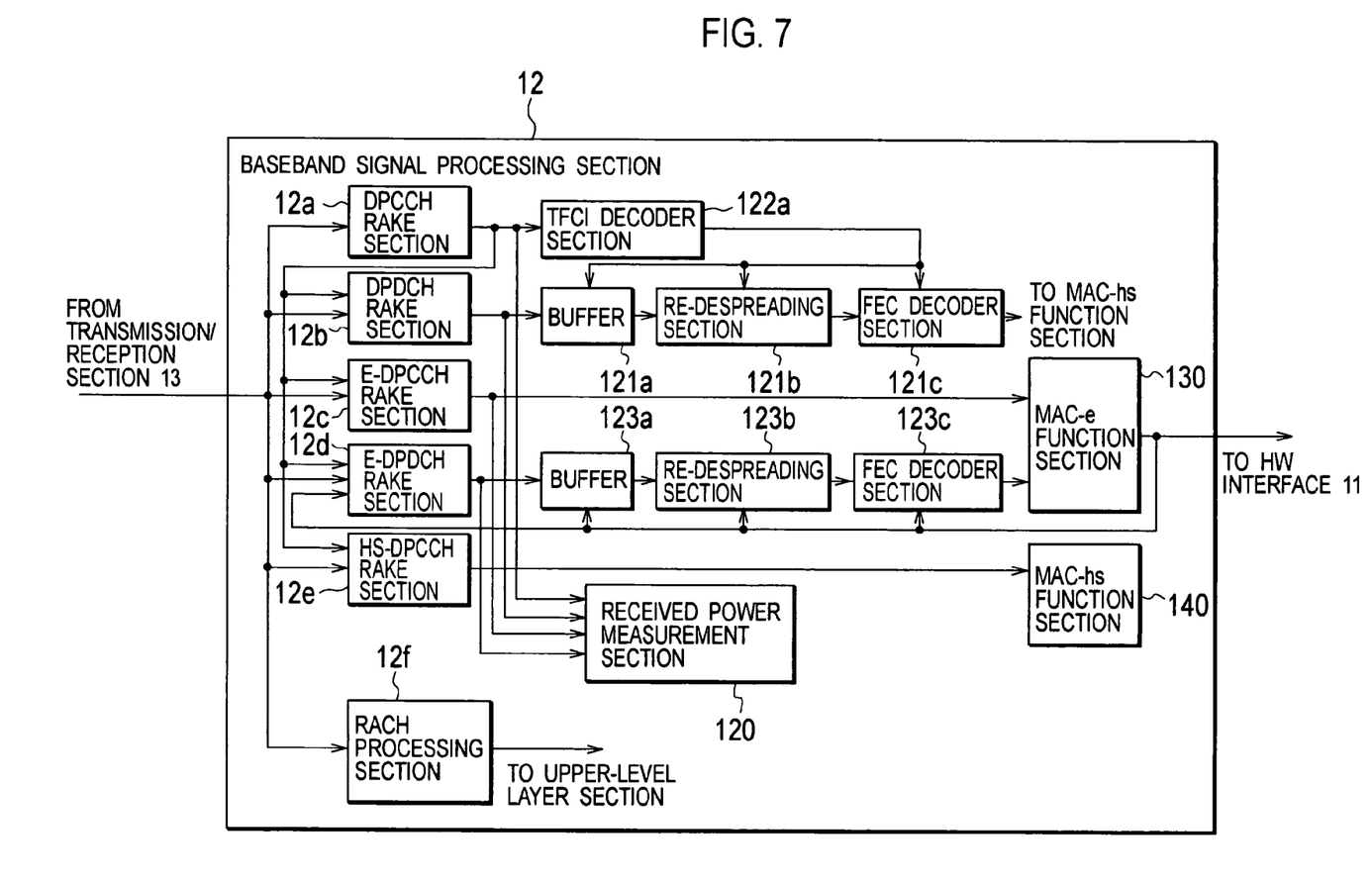
FIG. 7 is a functional block diagram of a baseband signal processing section in the base station according to the first embodiment of the present invention.

Specifically, as shown in FIG. 7, the baseband signal processing section 12 includes a DPCCH RAKE section 12a, a DPDCH RAKE section 12b, an E-DPCCH RAKE section 12c, an E-DPDCH RAKE section 12d, an HS-DPCCH RAKE section 12e, a RACH processing section 12f, a received power measurement section 120, buffers 121a and 123a, re-despreading sections 121b and 123b, FED decoder sections 121c and 123c, a TFCI decoder section 122a, aMAC-e function section 130, and aMAC-hs function section 140.

Note that, in an example of FIG. 7, only a configuration for performing the processing for the uplink data in the baseband signal processing section 12 is shown.

Note that, a dedicated physical channel DPCH for use in the mobile communication system according to this embodiment includes a dedicated physical control channel DPCCH, and a dedicated physical data channel DPDCH.

Here, in the dedicated physical control channel DPCCH, a pilot symbol for use in the RAKE synthesis processing and SIR measurement processing, a TFCI (Transport Format Combination Indicator) showing a format pattern of the data, and the like are mapped.

Moreover, an enhanced dedicated physical channel E-DPCH for use in the mobile communication system according to this embodiment includes an enhanced dedicated physical data channel E-DPDCH for transferring the data, and an enhanced dedicated physical control channel E-DPCCH for mapping a transmission format of the E-DPDCH, HARQ information, and the like.

Moreover, a high-speed dedicated physical control channel HS-DPCCH is required for the channel to which the HSDPA is applied in the downlink communication in the mobile communication system according to this embodiment. Note that the high-speed dedicated physical control channel HS-DPCCH includes a downlink quality identifier CQI (CPICH quality indicator), and ACK/NACK. Moreover, in the mobile communication system according to this embodiment, a RACH which is a channel for use in a random access is also used.

A description will be briefly made below of an operation of the baseband signal processing section 12 for the uplink data transmitted from the transmission/reception section 13.

First, a baseband signal transferred from the transmission/reception section 13 is inputted to the RAKE sections 12a, 12b, 12c, 12d and 12e of the respective channels.

Second, the respective RAKE sections 12a, 12b, 12c, 12d and 12e extract channels corresponding thereto from the inputted baseband signal, and for the extracted channels, performs the dispreading processing and the RAKE synthesis processing using the pilot symbols of the DPCCH.

Third, the received power measurement section 120 calculates a "total interference noise rise", and an "enhanced noise rise" or a "non-enhanced noise rise" from the despread signals (signals before being subjected to the RAKE synthesis processing) of the respective channels.

The "enhanced noise rise" is obtained from the despread signal of the E-DPCCH and the despread signal of the E-DPDCH. The "non-enhanced noise rise" is obtained from the despread signals of channels other than the above-described two channels.

Note that, since a relationship such that the "total interference noise rise" is equal to the sum of the "enhanced noise rise" and the "non-enhanced noise rise" is established, if two of the three items are obtained, then the rest item can be obtained by a subtraction.

Specifically, the received power measurement section 120 is configured to measure the enhanced noise rise which is a ratio of interference power in the enhanced dedicated channels (E-DPCCH and E-DPDCH) within a predetermined frequency bandwidth and noise power within the predetermined frequency bandwidth.

Moreover, the received power measurement section 120 may be configured to measure the non-enhanced noise rise which is a ratio of the interference power of the enhanced channels within a predetermined frequency bandwidth and noise power within the predetermined frequency bandwidth in place of the enhanced noise rise.

Furthermore, the received power measurement section 120 is configured to measure the total interference noise rise which is a ratio of the interference power in the entire channels (E-DPCCH, E-DPDCH, DPCCH, DPDCH, HS-DPCCH, RACH, and the like in the example of FIG. 7) for use in the uplink communication within a predetermined frequency bandwidth and noise power within the predetermined frequency bandwidth.

Moreover, the received power measurement section 120 is configured to notify the enhanced noise rise measured for each frequency bandwidth and the total interference noise rise, to the radio network controller RNC through the HWY interface.

Note that the received power measurement section 120 may be configured to notify the non-enhanced noise rise measured for each frequency bandwidth and the total interference noise rise, to the radio network controller RNC through the HWY interface.

Note that the MAC-e function is configured to perform the above-described layer 1 processing.

The transmission/reception section 13 is configured to perform processing for converting the received downlink data (baseband signal) into a radio frequency band. Moreover, the transmission/reception section 13 is configured to perform processing for converting the received uplink data to the baseband signal.

The amplifier section 14 is configured to amplify the downlink data received from the transmission/reception section 13, and to transmit the amplified downlink data through the transmission/reception antenna 15. Moreover, the amplifier section 14 is configured to amplify the uplink data received through the transmission/reception antenna 15, and to transfer the amplified uplink data to the transmission/reception section 13.

The call control section 16 is configured to transmit and receive a call control signal to and from the radio network controller RNC, and to perform processing such as a state management of the respective function sections in the base station Node-B and an assignment of the hardware resource by the layer 3.

Figure 8:
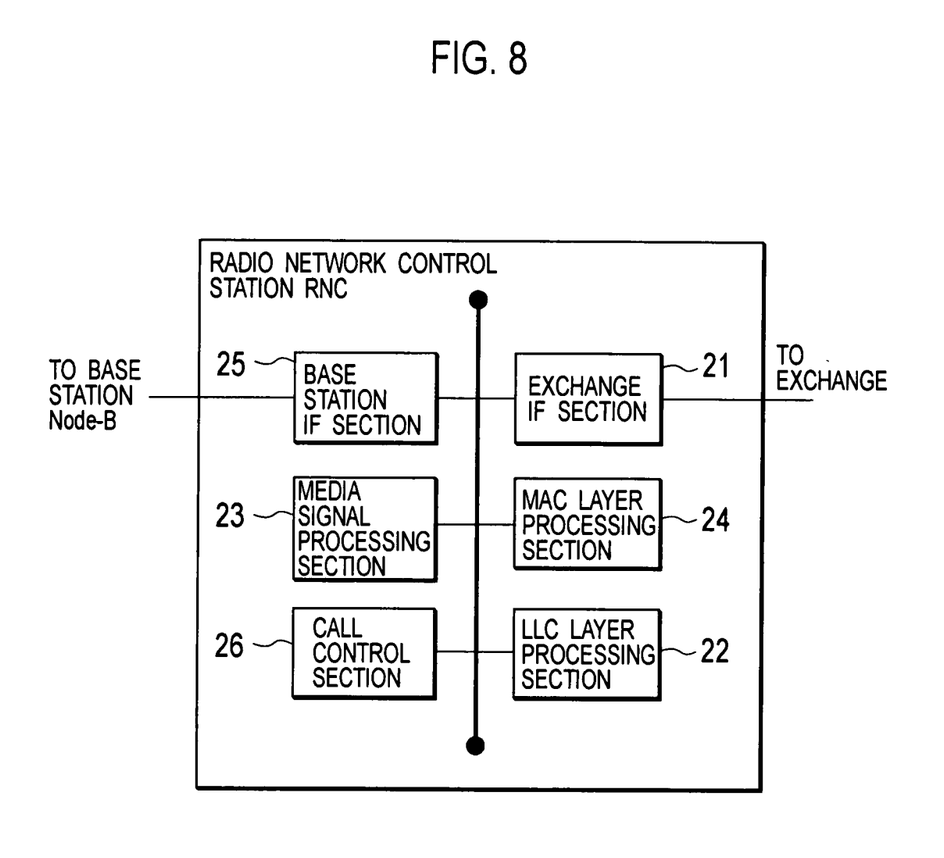
FIG. 8 is a functional block diagram of a radio network controller according to the first embodiment of the present invention.

FIG. 8 is a view showing a schematic configuration of the radio network controller RNC of the mobile communication system according to this embodiment.

As shown in FIG. 8, the radio network controller RNC includes an exchange IF section 21, an LLC layer processing section 22, a media signal processing section 23, a MAC layer processing section 24, a base station IF section 25, and a call control section 26.

A description will be briefly made below of an operation of the radio network controller RNC for the downlink data transmitted from an exchange.

First, the exchange interface section (exchange IF section) 21 transfers the downlink data, which is transmitted from the exchange, to a logical link control (LLC) layer processing section 22. However, voice data and real-time image data are transferred to the LLC layer processing section 22 via the media signal processing section 23.

Second, the LLC layer processing section 22 performs the LLC sub layer processing such as synthesis processing of a header or a trailer such as a sequence number for the transferred downlink data.

Third, the LLC layer processing section 22 transfers the downlink data for which the LLC sub layer processing has been performed, to the MAC layer processing section 24.

Fourth, the MAC layer processing section 24 performs the MAC layer processing such as a priority control and a header addition for the transferred downlink data, and then transfers the downlink data to the base station Node-B through the base station IF section 25.

Next, a description will be briefly made of an operation of the radio network controller RNC for the uplink data transmitted from the base station Node-B.

First, the base station IF section 25 transfers the uplink data, which is transmitted from the base station Node-B, to the MAC layer processing section 24.

Second, the MAC layer processing section 24 performs the MAC layer processing for the transferred uplink data.

Third, the MAC layer processing section 24 transfers the uplink data for which the MAC layer processing has been performed, to the LLC layer processing section 22.

Fourth, the LLC layer processing section 22 performs the LLC layer processing for the transferred uplink data, and then transfers the uplink data to the exchange through the exchange IF section 21.

Note that the call control section 26 is configured to perform call acceptance control processing, setting and releasing processing for a channel using the layer 3 signaling.

Specifically, the call control section 26 is configured to determine whether or not to set a new channel within a predetermined frequency bandwidth, based on the "enhanced noise rise" and the "total interference noise rise", which are notified from the base station Node-B, in response to a setup request for the new channel from the mobile station UE.

Figure 9:
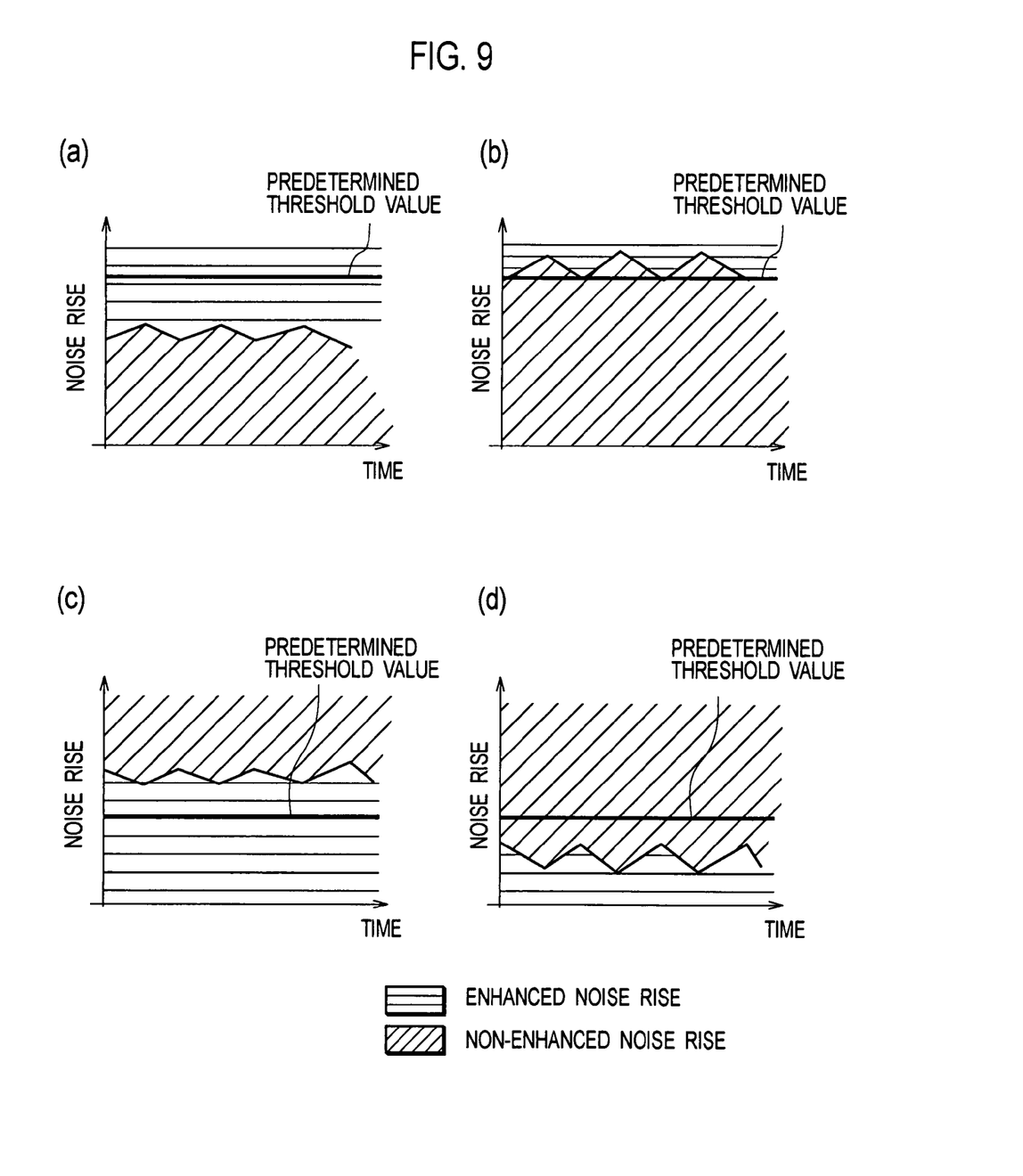
FIGS. 9(a) to 9(d) are views for explaining a determination method as to whether or not a setup of a new channel is to be accepted in the mobile communication system according to the first embodiment of the present invention.

Specifically, as shown in FIG. 9(*a*), when a value (non-enhanced noise rise) obtained by subtracting the enhanced noise rise from the total interference noise rise within a predetermined frequency bandwidth falls down below a predetermined threshold value, the call control section 26 determines that the new channel is to be set within the predetermined frequency bandwidth.

Meanwhile, as shown in FIG. 9(*b*), when the value (non-enhanced noise rise) obtained by subtracting the enhanced noise rise from the total interference noise rise within the predetermined frequency bandwidth exceeds the predetermined threshold value, the call control section 26 determines that the new channel is not to be set within the predetermined frequency bandwidth.

Note that such predetermined threshold value may be configured so that a value that varies depending on a type of the new channel required to be set by the mobile station UE can be used therefor.

Moreover, the call control section 26 may be configured to determine whether or not to set the new channel within the predetermined frequency bandwidth, based on the "non-enhanced noise rise" and the "total interference noise rise", which are notified form the base station Node-B, in response to the setup request for the new channel from the mobile station UE.

Specifically, as shown in FIG. 9C, when a value (enhanced noise rise) obtained by subtracting the non-enhanced noise rise from the total interference noise rise within the predetermined frequency bandwidth exceeds a predetermined threshold value, the call control section 26 may determine that the new channel is to be set within the predetermined frequency bandwidth.

Meanwhile, as shown in FIG. 9(*d*), when the value (enhanced noise rise) obtained by subtracting the non-enhanced noise rise from the total interference noise rise within the predetermined frequency bandwidth falls down below the predetermined threshold value, the call control section 26 may determine that the new channel is not to be set within the predetermined frequency bandwidth.

Note that such predetermined threshold value may be configured so that a value that varies depending on the type of the new channel required to be set by the mobile station UE can be used therefor.

Operation of Mobile Communication System According to First Embodiment of the Present Invention A description will be made of a first operation of the call control section 26 of the radio network controller RNC, when a new call is generated (that is, when a setup of the new channel is requested by the mobile station UE) in the mobile communication system according to this embodiment with reference to FIG. 10.

Figure 10:
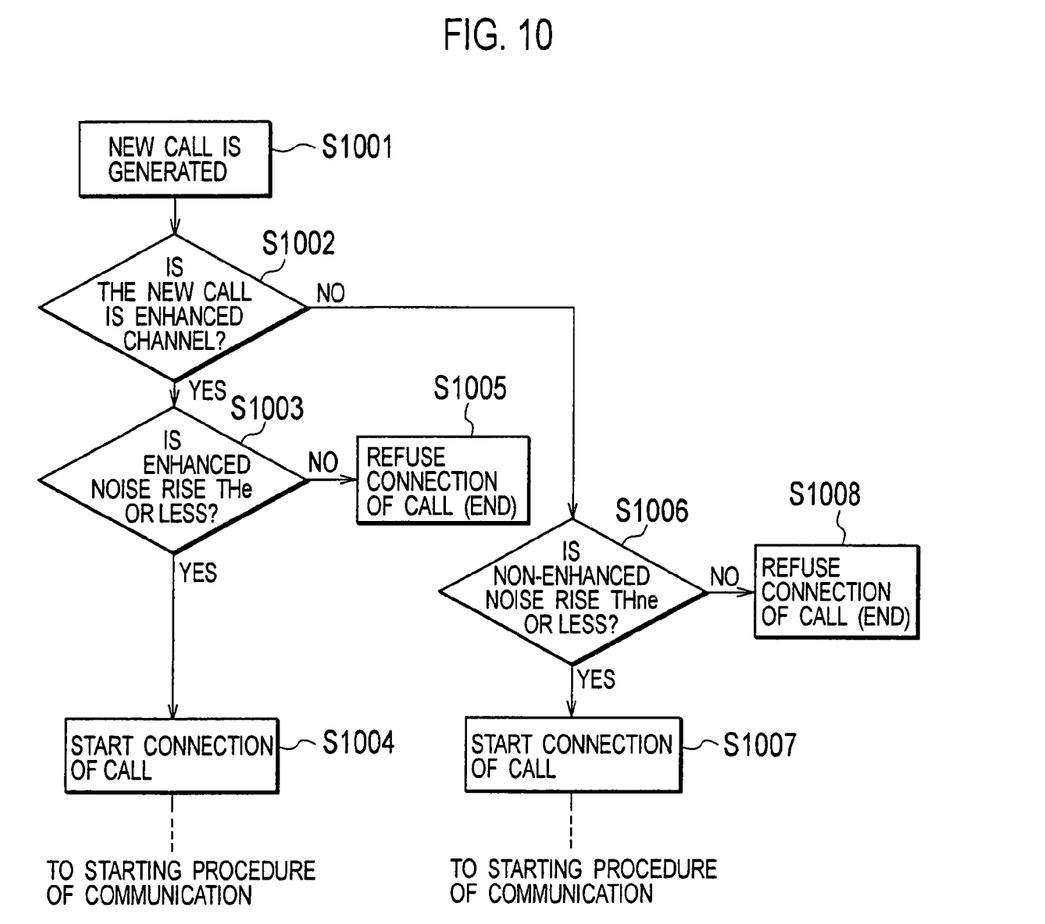
FIG. 10 is a flowchart showing a first operation of the mobile communication system according to the first embodiment of the present invention.

As shown in FIG. 10, in Step S1001, the new call is generated.

In Step S1002, the call control section 26 confirms a type of the new call (that is, a new channel). Specifically, the call control section 26 identifies whether such new call is a call (an enhanced channel) to which the Enhanced Uplink is applied or a call (a non-enhanced channel) to which the Enhanced Uplink is not applied.

When the new call is the call (the enhanced channel) to which the Enhanced Uplink is applied, the call control section 26 compares a first predetermined threshold value THe with the enhanced noise rise, in Step S1003.

When the enhanced noise rise is larger than the first predetermined threshold value THe, the call control section 26 refuses a connection of the new call in the predetermined frequency bandwidth (that is, does not set the new channel within the predetermined frequency bandwidth), in Step S1005.

Meanwhile, when the enhanced noise rise is equal to or smaller than the first predetermined threshold value THe, the control section 26 starts the connection of the new call in the predetermined frequency bandwidth (that is, sets the new channel within the predetermined frequency bandwidth), in Step S1004.

Moreover, when the new call is the call (the non-enhanced channel) to which the Enhanced Uplink is not applied, the call control section 26 compares a second predetermined threshold value THne with the non-enhanced noise rise, in Step S1006.

When the non-enhanced noise rise is larger than the second predetermined threshold value THne, the call control section 26 refuses a connection of the new call in the predetermined frequency bandwidth (that is, does not set the new channel within the predetermined frequency bandwidth), in Step S1008.

Meanwhile, when the non-enhanced noise rise is equal to or smaller than the second predetermined threshold value THne, the control section 26 starts the connection of the new call in the predetermined frequency bandwidth (that is, sets the new channel within the predetermined frequency bandwidth), in Step S1007.

Moreover, a description will be made of a second operation of the call control section 26 of the radio network controller RNC when the new call is generated (that is, when the setup of the new channel is requested by the mobile station UE) in the mobile communication system according to this embodiment, with reference to FIG. 11.

Figure 11:
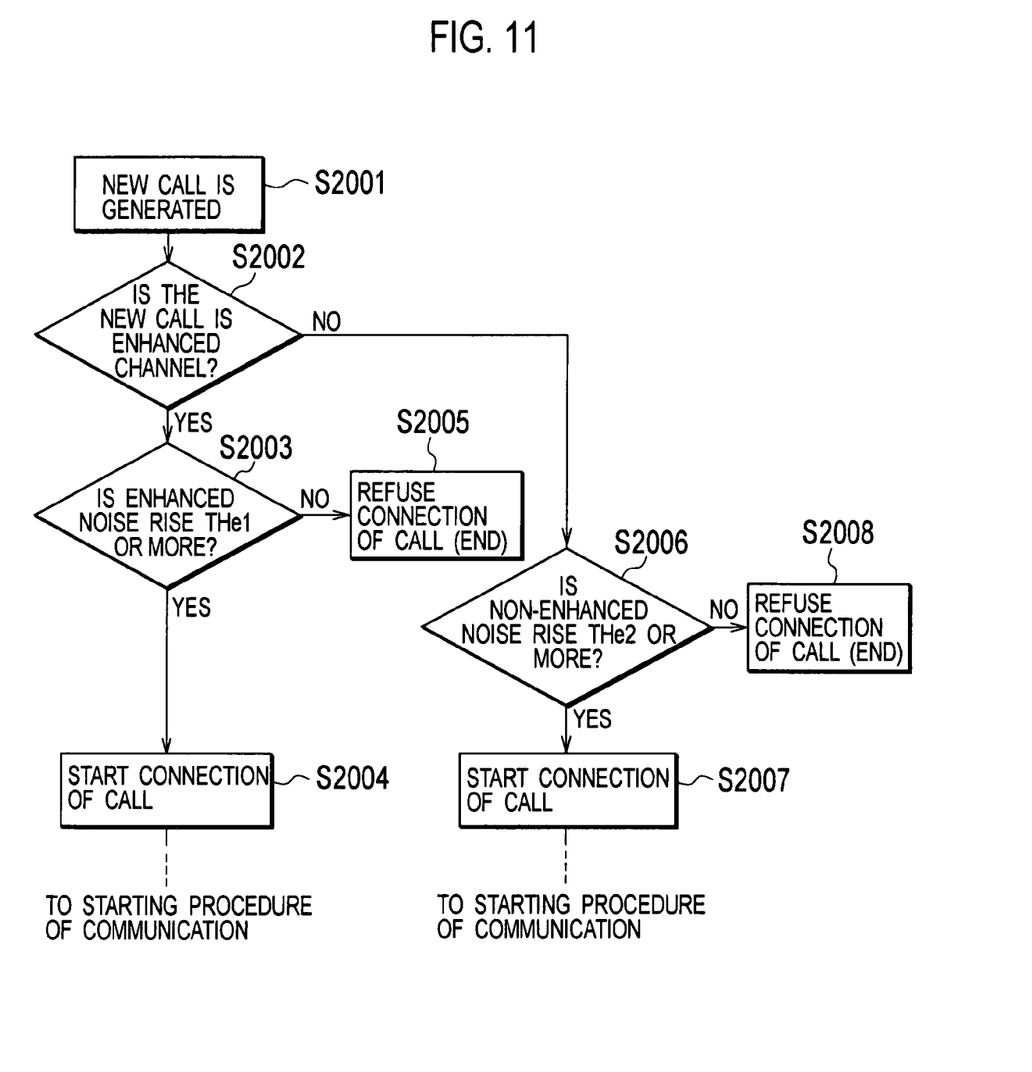
FIG. 11 is a flowchart showing a second operation of the mobile communication system according to the first embodiment of the present invention.

As shown in FIG. 11, in Step S2001, the new call is generated.

In Step S2002, the call control section 26 confirms the type of the new call (that is, the new channel). Specifically, the call control section 26 identifies whether such new call is the call (the enhanced channel) to which the Enhanced Uplink is applied or the call (the non-enhanced channel) to which the Enhanced Uplink is not applied.

When the new call is the call (the enhanced channel) to which the Enhanced Uplink is applied, the call control section 26 compares a first predetermined threshold value THe1 with the enhanced noise rise, in Step S2003.

When the enhanced noise rise is smaller than the first predetermined threshold value THe1, the call control section 26 refuses a connection of the new call in the predetermined frequency bandwidth (that is, does not set the new channel within the predetermined frequency bandwidth), in Step S2005.

Meanwhile, when the enhanced noise rise is equal to or larger than the first predetermined threshold value THe1, the control section 26 starts the connection of the new call in the predetermined frequency bandwidth (that is, sets the new channel within the predetermined frequency bandwidth), in Step S2004.

Moreover, when the new call is the call (the non-enhanced channel) to which the Enhanced Uplink is not applied, the call control section 26 compares a second predetermined threshold value THe2 with the enhanced noise rise, in Step S2006.

When the enhanced noise rise is smaller than the second predetermined threshold value THe2, the call control section 26 refuses a connection of the new call in the predetermined frequency bandwidth (that is, does not set the new channel within the predetermined frequency bandwidth), in Step S2008.

Meanwhile, when the enhanced noise rise is equal to or larger than the second predetermined threshold value THe2, the control section 26 starts the connection of the new call in the predetermined frequency bandwidth (that is, sets the new channel within the predetermined frequency bandwidth), in Step S2007.

Function/Effect of Mobile Communication System According to First Embodiment of the Present Invention In accordance with the mobile communication system according to this embodiment, an occupation ratio of the "enhanced channel (the enhanced dedicated physical channel E-DPCH)" and the "non-enhanced channel" in the radio resource can be grasped, and appropriate call acceptance control processing in response to the priority can be performed.

Moreover, in accordance with the mobile communication system according to this embodiment, an excessive setup of the circuit switching channel, and a deterioration of the mobile communication quality, which follows the excessive setup, can be prevented.

Furthermore, in accordance with the mobile communication system according to this embodiment, the predetermined threshold value for use in the call acceptance control processing is changed between the enhanced channel and the non-enhanced channel, thus making it possible to perform the priority control (that is, a flexible call acceptance control) in accordance with the type of the channel, and to construct a highly functional network.

As described above, according to the present invention, in the mobile communication system using the Enhanced Uplink, there can be provided the mobile communication method, the base station, and the radio network controller, which grasp the noise rise (the enhanced noise rise) of the enhanced channel and the noise rise (the non-enhanced noise rise) of the non-enhanced channel, perform the appropriate call acceptance control processing in response to the priority, thereby maximize the capacity of the radio resource for use in the circuit switching channel (the circuit switching call) without refusing the circuit switching call owing to the increase of the noise rise by the Enhanced Uplink, and provide a data communication as a best effort service using the usable radio resource.

The description has been made above in detail of the present invention by the embodiments; however, it is obvious for those skilled in the art that the present invention is not limited to the embodiments described in this application. The apparatus of the present invention can be embodied as modified and changed modes without desectioning from the gist and scope of the present invention, which are defined by the description of the scope of claims. Hence, the description of this application is for illustration and explanation purpose, and does not have any restrictive meaning to the present invention at all.

Industrial Applicability

As described above, according to the present invention, in the mobile communication system using the Enhanced Uplink, there can be provided the mobile communication method, the base station, and the radio network controller, which maximize the capacity of the radio resource for use in the circuit switching channel (the circuit switching call), and provide the data communication as the best effort service using the usable radio resource.

The invention claimed is:

1. A mobile communication method for using an enhanced dedicated channel, in which a transmission rate is controlled in a layer 1 and a layer 2, for an uplink communication from a mobile station to a base station, the method comprising the steps of:
measuring an enhanced interference power in the enhanced dedicated channel within a predetermined frequency bandwidth;
measuring a total interference power in entire channels for use in the uplink communication within the predetermined frequency; and
determining whether or not to set a new channel within the predetermined frequency bandwidth, based on the enhanced interference power and the total interference power, in response to a setup request for the new channel from the mobile station;
wherein, when a value obtained by subtracting the enhanced interference power from the total interference power within the predetermined frequency bandwidth falls down below a predetermined threshold value, it is determined that the new channel is to be set within the predetermined frequency bandwidth.

2. A base station in a mobile communication system using an enhanced dedicated channel, in which a transmission rate is controlled in a layer 1 and a layer 2, for an uplink communication from a mobile station to a base station, comprising:
a received power measurement section; and
a call control section, wherein
the received power measurement section is configured to measure an enhanced interference power in the enhanced dedicated channel within a predetermined frequency bandwidth;

the received power measurement section is configured to measure a total interference power in entire channels for use in the uplink communication within the predetermined frequency bandwidth; and the call control section is configured to determine whether or not to set a new channel within the predetermined frequency bandwidth, based on the enhanced interference power and the total interference power, in response to a setup request for the new channel from the mobile station;

wherein, when a value obtained by subtracting the enhanced interference power from the total interference power within the predetermined frequency bandwidth falls down below a predetermined threshold value, the call control section determines that the new channel is to be set within the predetermined frequency bandwidth.

* * * * *